(12) United States Patent
Jeon

(10) Patent No.: US 8,689,360 B2
(45) Date of Patent: Apr. 1, 2014

(54) PROBE HEAD SCANNING PROBE MICROSCOPE INCLUDING THE SAME

(75) Inventor: In-su Jeon, Incheon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/568,768

(22) Filed: Aug. 7, 2012

(65) Prior Publication Data
US 2013/0111635 A1 May 2, 2013

(30) Foreign Application Priority Data
Oct. 26, 2011 (KR) .................. 10-2011-0110052

(51) Int. Cl.
*G01Q 70/02* (2010.01)
(52) U.S. Cl.
USPC ............. 850/22; 850/6; 850/21; 850/53
(58) Field of Classification Search
USPC .......... 250/21, 22, 23, 24, 25; 850/21, 22, 23, 850/24, 25, 6, 53
See application file for complete search history.

(56) References Cited

U.S. PATENT DOCUMENTS

| | | | | |
|---|---|---|---|---|
| 4,488,069 A | * | 12/1984 | Field, II | 310/49.36 |
| 5,245,863 A | * | 9/1993 | Kajimura et al. | 73/105 |
| 5,408,094 A | * | 4/1995 | Kajimura | 250/234 |
| 5,689,063 A | * | 11/1997 | Fujiu et al. | 73/105 |
| 5,756,997 A | * | 5/1998 | Kley | 850/1 |
| 5,760,396 A | * | 6/1998 | Lindsay et al. | 850/1 |
| 6,018,991 A | * | 2/2000 | Nakano | 73/105 |
| 6,189,373 B1 | * | 2/2001 | Ray | 73/105 |
| 7,597,717 B1 | * | 10/2009 | Lu et al. | 850/22 |
| 2009/0138994 A1 | * | 5/2009 | Kawakatsu | 850/21 |
| 2011/0277192 A1 | * | 11/2011 | Park et al. | 850/1 |

FOREIGN PATENT DOCUMENTS

| | | | | |
|---|---|---|---|---|
| JP | 2007071740 A | | 3/2007 | |
| JP | 2008016676 A | | 1/2008 | |
| JP | 2010192612 A | | 9/2010 | |
| KR | 1020030087348 A | | 11/2003 | |
| KR | 2005021853 A | * | 3/2005 | G01Q 60/24 |

* cited by examiner

*Primary Examiner* — Michael Logie
(74) *Attorney, Agent, or Firm* — Sughrue Mion, PLLC

(57) ABSTRACT

A probe head and a scanning probe microscope (SPM) including the probe head are provided. The probe head includes a plurality of cantilevers, each including a probe; and a holder on which the plurality of cantilevers are installed, wherein a cantilever facing a sample is changed by rotating the holder.

22 Claims, 5 Drawing Sheets

PROBE HEAD SCANNING PROBE MICROSCOPE INCLUDING THE SAME

CROSS-REFERENCE TO RELATED APPLICATION

This application claims priority from Korean Patent Application No. 10-2011-0110052, filed on Oct. 26, 2011, in the Korean Intellectual Property Office, the disclosure of which is incorporated herein in its entirety by reference.

BACKGROUND

1. Field

Apparatuses and methods consistent with exemplary embodiments relate to probe heads and scanning probe microscopes including the same, and more particularly, to a probe head including a changeable cantilever of rotary type and a scanning probe microscope.

2. Description of the Related Art

A scanning probe microscope (SPM) is an apparatus for investigating the morphology and physical characteristics of a surface of a sample by using a probe. SPMs are classified into various types according to a sensing method, a type of probe, a physical quantity to be measured, or the like. A basic type of SPM is an atom force microscope (AFM) and uses a method of measuring a force applied to a probe attached to an end of a cantilever by measuring bending of the cantilever.

The probe of the cantilever is a kind of consumable good that is easily blunted and damaged by use. A process including changing a cantilever and then aligning and approaching a laser is one of the processes of an SPM, which are very inconvenient and require a long period of time.

In particular, industrial equipment requires a function of automatically changing a probe in order to obtain process automation.

One apparatus uses a method of automatically changing a probe, in which the head of an SPM is moved to a point where a non-used probe is located. It takes a longer period of time to perform this method than in a case where an operator directly changes the probe. In addition, it is not easy to correctly return to a point that is scanned prior to changing of the probe.

Thus, a method of rapidly and easily changing a cantilever without a change in a scanning position or a change in laser alignment is very important and improves convenience in an SPM. In particular, the method is a necessary method of an industrial SPM of which a probe needs to be frequently changed.

SUMMARY

One or more exemplary embodiments provide probe heads including a probe holder of rotary type and a cantilever that is changeable without a change in a scanning position and a change laser alignment, and scanning probe microscopes including the probe heads.

Additional aspects will be set forth in part in the description which follows and, in part, will be apparent from the description, or may be learned by practice of the presented embodiments.

According to an aspect of an exemplary embodiment, a probe holder includes a plurality of cantilevers including probe, respectively; and a holder on which the plurality of cantilevers are installed, wherein a cantilever facing a sample is changed by rotating the holder.

According to an aspect of another exemplary embodiment, a probe head includes a holder on which a plurality of cantilevers are installed, wherein probe is configured on ends of the plurality of cantilevers, respectively; and a supporting portion to which the holder is rotatably coupled and which supports the holder, wherein a cantilever facing a sample is changed by rotating the holder.

According to an aspect of another exemplary embodiment, a scanning probe microscope (SPM) includes a probe head; and a stage to which the probe head is coupled, wherein the probe head includes a holder on which a plurality of cantilevers are installed, wherein probe is configured on ends of the plurality of cantilevers, respectively; and a supporting portion to which the holder is rotatably coupled and which supports the holder, and wherein a cantilever facing a sample is changed by rotating the holder.

The plurality of cantilevers may be detachably installed on the holder.

The plurality of cantilevers may be installed on the holder so as to have the same distance to a rotation axis of the holder.

The holder may be detachably coupled to the supporting portion.

A plurality of kinds of probes for measuring at least two kinds of different physical properties may be respectively configured on the plurality of cantilevers installed on the holder.

The probe head may be coupled to a stage of a scanning probe microscope (SPM), and the stage may comprise a stage for adjusting an interval between sample and a probe of a cantilever facing the sample.

The probe head may further include a light source for emitting light; and a photodetector for detecting light that is emitted from the light source and is reflected off the cantilever, so as to measure bending of a cantilever positioned to face a sample, wherein the light source and the photodetector may be spaced apart from the holder.

The probe head may further include a reflective mirror installed on the supporting portion, wherein light emitted from the light source may proceed towards a cantilever facing the sample by the reflective mirror, or light reflected of the cantilever proceeds towards photodetector by the reflective mirror.

The holder may be detached from the supporting portion after all the plurality of cantilever are used as a cantilever facing a sample is changed by rotating the holder.

The light source and the photodetector may be installed on the probe head.

According to one or more exemplary embodiments, when the above-described probe head and the above-described SPM including the probe head are used, large numbers of cantilevers may be mounted on the probe head, the cantilevers may be rapidly and easily changed without a change in a scanning position or a change in laser alignment by using a probe holder of rotary type. In addition, since the scanning position is barely changed, various kinds of probes may be mounted on the probe holder and various physical properties of a single spot may be easily scanned as the probes are exchanged with each other according to a desired function

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
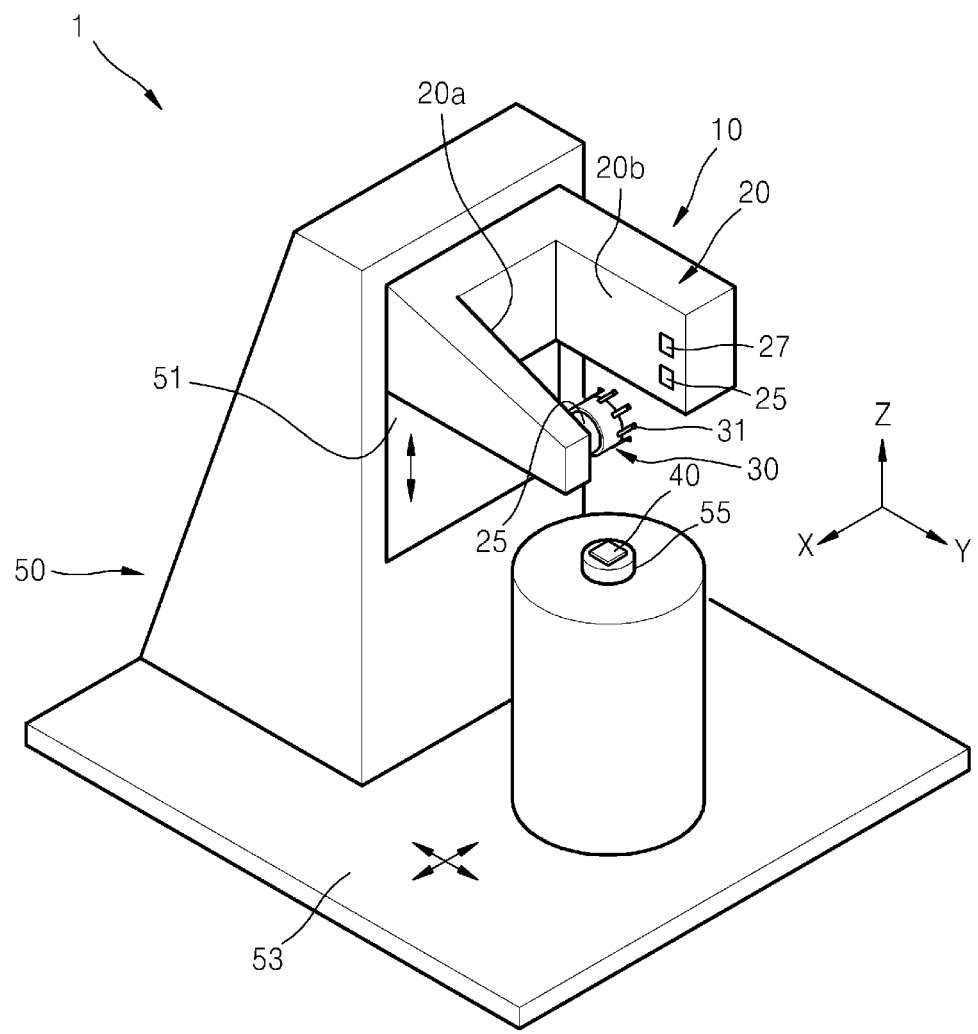
FIG. 1 is a schematic perspective view of main parts of a scanning probe microscope (SPM) including a probe head, according to an exemplary embodiment.

Reference will now be made in detail to exemplary embodiments, examples of which are illustrated in the accompanying drawings, wherein like reference numerals refer to the like elements throughout. In this regard, the present embodiments may have different forms and should not be construed as being limited to the descriptions set forth herein. Accordingly, the exemplary embodiments are merely described below, by referring to the figures.

With regard to a general scanning probe microscope (SPM), only a single probe is installed on a header. The SPM may be classified as a scanning tunneling microscope (STM) for measuring a tunnel current, an atomic force microscope (AFM) for detecting a surface morphology by using Van der Waals force, a lateral force microscope (LFM) for detecting a surface difference by using a friction force, a magnetic force microscope for detecting the characteristic of a magnetic field by using a probe exhibiting magnetism, an electrostatic force microscope for measuring an electric field by applying a voltage between a sample and a probe, or another type as would be understood by one of skill in the art.

In a probe head according to an exemplary embodiment, a head portion on which a probe is installed, that is, a probe holder is of a rotary type, a plurality of cantilevers are installed on the probe holder, and probes are attached to respective ends of the cantilevers. The probe holder is rotated in order to change a probe, and thus a cantilever having a blunt probe may be rapidly and easily exchanged with a new cantilever.

The number of the cantilevers installed on the probe holder is not particularly limited as long as an interval between the cantilevers may be ensured so that, when a cantilever approaches a sample, neighboring cantilevers may not contact the sample. In addition, a circumference of a circular holder is proportional to a diameter of the circular holder. Thus, as a diameter of the rotary probe holder is increased, more cantilevers may be installed on the rotary probe holder.

The probe head according to an exemplary embodiment may be used in various apparatuses using a probe as well as in a SPM. Hereinafter, a case where the probe head according to an exemplary embodiment is used in a SPM, for example, an AFM will be described.

Figure 2:
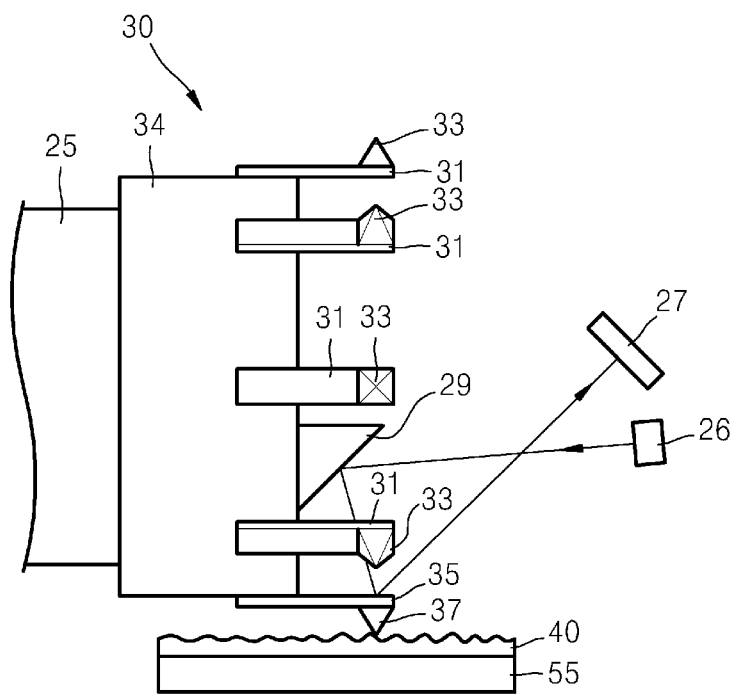
FIG. 2 is a structural diagram of a probe head according to an exemplary embodiment.
Figure 3:
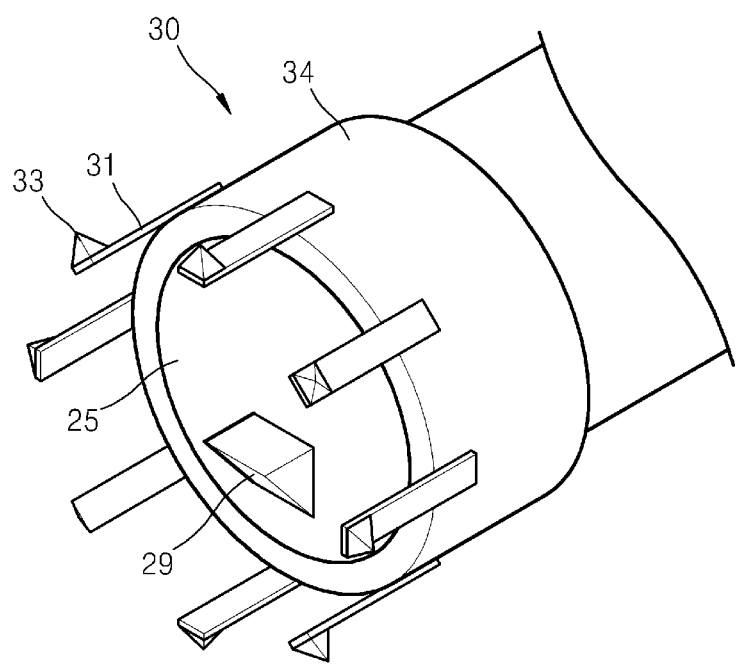
FIG. 3 is a perspective view of a probe holder of a probe head according to an exemplary embodiment.
Figure 4:
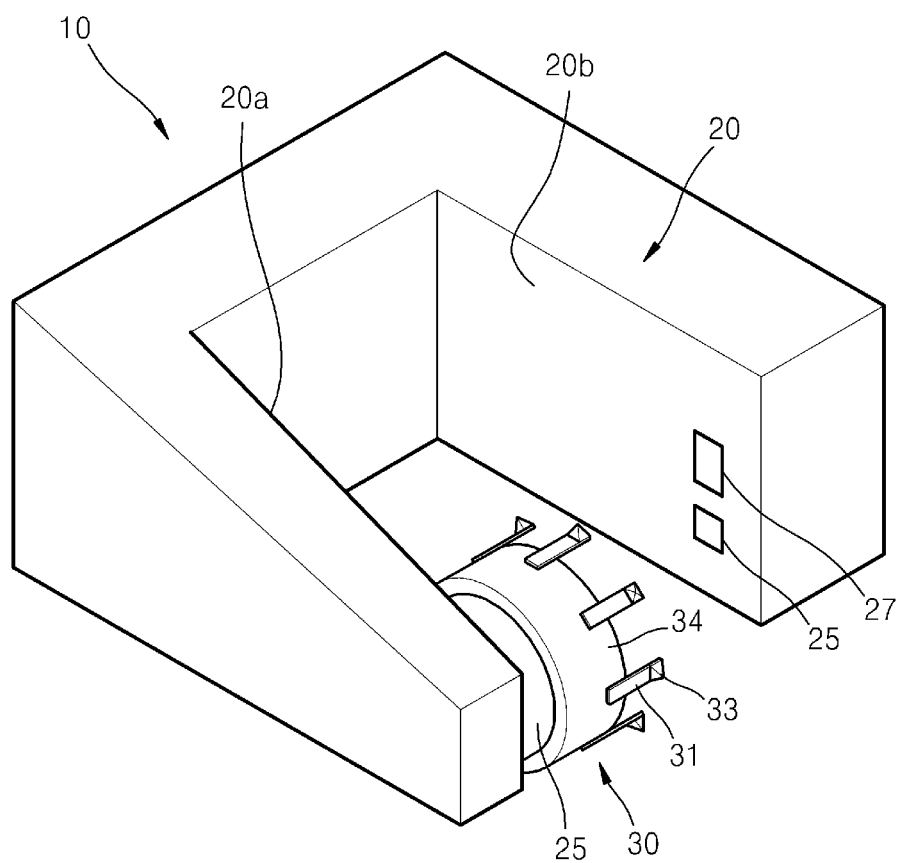
FIGS. 4 and 5 are perspective views of a probe head according to an exemplary embodiment.
Figure 5:
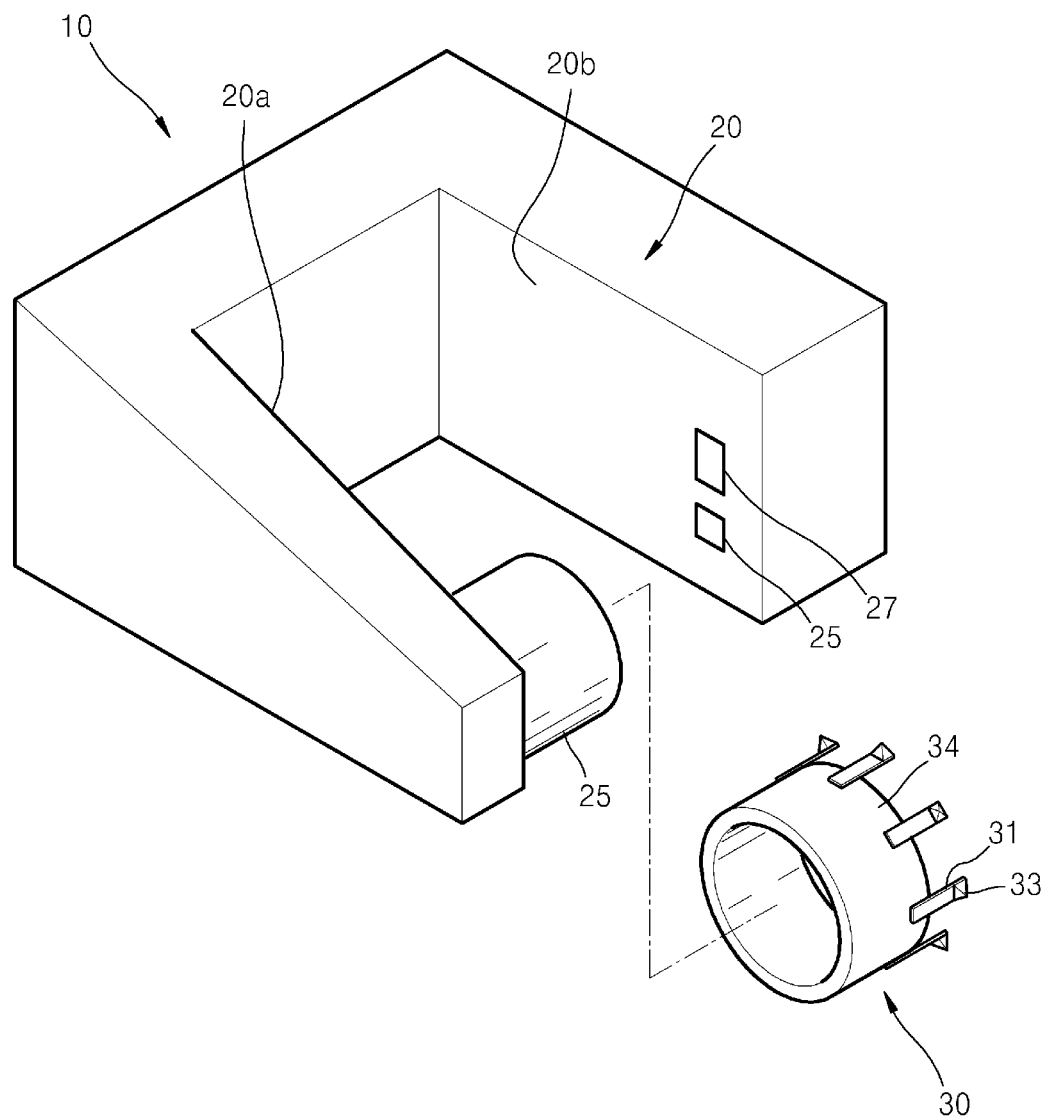

FIG. 1 is a schematic perspective view of main parts of an SPM 1 including a probe head 10, according to an exemplary embodiment. FIG. 2 is a structural diagram of the probe head 10 according to an exemplary embodiment and shows a case where the probe head 10 according to an exemplary embodiment is configured to be suitable for AFM. FIG. 3 is a perspective view of a probe holder 30 of the probe head 10 according to an exemplary embodiment. FIGS. 4 and 5 are perspective views of the probe head 10 according to an exemplary embodiment. That is, FIG. 4 shows a case where the probe holder 30 is coupled to a supporting portion 25 and FIG. 5 shows a case where the probe holder 30 is decoupled from the supporting portion 25.

Referring to FIGS. 1 through 5, the SPM 1 includes the probe head 10 and a stage 50 to which the probe head 10 is coupled.

The probe head 10 includes a probe holder on which a plurality of cantilevers 31 are installed and the supporting portion 25 to which the probe holder 30 is rotatably coupled. The probe holder 30 may refer to only a holder 34 for installing the cantilevers 31 thereon or include the holder 34 and the cantilevers 31 installed thereon. Probes 33 are attached to ends of the cantilevers 31, respectively. The probe head 10 is configured that the probe holder 30 may be rotated to change a cantilever 35 facing a sample 40. In this case, the probes 33 may be respectively integrated with the cantilevers 31 rather than being respectively attached to the ends of the cantilevers 31. For convenience, a cantilever facing the sample 40 and a corresponding probe are denoted 35 and 37, respectively.

Probes having different functions may be installed on the cantilevers 31 installed on the probe head 10. For example, a probe serving as a conductor and a probe coated with a magnetic material are installed on the cantilevers 31, and different physical properties, for example, electrical properties and magnetic properties of a same point may be measured.

The supporting portion 25 may be formed on a head structure 20. For example, as shown in FIGS. 1, 4, and 5, the head structure 20 may be configured to have a cramp shape overall. The supporting portion 25 may be formed protruding from an inner side surface 20a from among internal side surfaces 20a and 20b facing each other.

The probe holder 30 may be rotatably coupled to the supporting portion 25. The rotation of the probe holder 30 may be finely controlled by a stepping motor or the like. The cantilevers 31 may be installed on the probe holder 30 so as to have the same distance to a rotation axis of the probe holder 30. The cantilevers 31 may be installed on the probe holder 30 at equidistant intervals with respect to the probe holder 34.

In FIGS. 2 through 5, the probe holder 30 has a cylindrical shape and the cantilevers 31 are installed on the outer circumference surface of the probe holder 30 at equidistant intervals.

Alternatively, the probe holder 30 may have a polygonal shape, for example, a hexagonal shape or an octagonal shape and the cantilevers 31 may be respectively positioned on sides of the polygonal shape, for example on centers of sides of the polygonal shape.

The shape of the probe holder 30 may not be particularly limited as long as the cantilevers 31 may be installed on the probe holder 30 so as to each have the same distance to the rotation axis of the probe holder 30.

The number of the cantilevers 31 installed on the probe holder 30 is not particularly limited as long as an interval between the cantilevers 31 may be ensured so that, when a cantilever approaches the sample 40, neighboring cantilevers 31 may not contact the sample 40. As an effective diameter of the probe holder 30 of rotary type is increased, more cantilevers 31 may be installed on the probe holder 30. In this case, the effective diameter of the probe holder 30 correspond to a distance from a rotation axis of the probe holder 30 to a portion on which each of the cantilevers 31 is installed.

As described above, when the cantilevers 31 are installed on the probe holder 30 so as to each have the same distance to a rotation axis of the probe holder 30, until all the cantilevers 31 installed on the probe holder 30 are used, the cantilevers 31, in particular, the probes 33 may be changed by simply rotating the probe holder 30. In this case, the cantilevers 31 may be changed without a change in a scanning position or a change in laser alignment. Thus, the cantilevers 31, in particular, the probes 33 may be rapidly and easily changed.

The cantilevers 31 may be detachably installed on the probe holder 30. For example, a clip structure may be formed on the probe holder 30 and the cantilevers 31 may be formed to be coupled to the clip structure. Thus, the cantilevers 31 may be easily installed on the probe holder 30 or may be detached from the probe holder 30.

The probe holder 30 may be rotatably installed on the supporting portion 25 and simultaneously may be detachably or fixedly installed on the supporting portion 25.

When the probe holder 30 is detachably installed on the supporting portion 25, if all the probes 33 of the cantilevers 31 mounted on the probe holder 30 are used, the probe holder 30 may be detached from the supporting portion 25 in order to change the cantilevers 31. In this case, in order to change the cantilevers 31, the probe holder 30 may be exchanged with a new probe holder on which new cantilevers are mounted, or alternatively the probe holder 30 may be detached from the supporting portion 25, the cantilevers 31 may be removed from the probe holder 30 and then new cantilevers may be coupled to the probe holder 30.

Alternatively, the probe holder 30 may be rotatably and detachably coupled to the supporting portion 25 and simultaneously the cantilevers 31 may be fixed to the probe holder 30. In this case, when all the cantilevers 31 are used, the probe holder 30 is removed from the supporting portion 25 and then a new probe holder on which a plurality of new cantilevers are mounted may be mounted on the supporting portion 25.

In addition, the cantilevers 31 may be changed without decoupling the probe holder 30 and the supporting portion 25.

In the probe head 10, when the probe 37 of the cantilever 35 facing the sample 40 scans a surface of the sample 40 and a tip of the probe 37 becomes blunt, a probe 33 of a cantilever 31 that is next to the cantilever 35 may be positioned to face the sample 40 and then a scanning operation may be performed again on the surface of the sample 40.

In this case, since many cantilevers 31 having probes 33 may be mounted on the probe holder 30 and the cantilevers 31 may be changed by rotating the probe holder 30, the probes 33 may be rapidly and easily changed. By simply rotating the probe holder 30, the probes 33 may be changed. For example, since the rotation of the probe holder 30 may be finely controlled by a stepping motor or the like, a position of a new probe may substantially match a position of the previous probe by rotating the probe holder 30, and thus the cantilevers 31 may be rapidly and easily changed without a change in a scanning position or a change in laser alignment.

The SPM 1 investigates the morphology and physical properties of the surface of the sample 40 by using the probes 33 attached to the ends of the cantilevers 31. For example, the cantilevers 31 may have a length and a width of several ten to several hundred μm and may be bent. In addition, the probes 33 each having a tip shaped like a pyramid may be attached on the ends of the cantilevers 31, respectively. When the SPM 1 is an AFM, topology of the sample 40 may be measured by using the cantilevers 31 that are bent due to Van der Waals force. That is, when tip of the probe 33 approach the sample 40, a repulsive force or an attractive force may act between atoms of the tip and atoms of the sample 40, which is referred to as Van der Waals force. In addition, the cantilever 31 may be bent due to Van der Waals force and the topology of the sample 40 may be measured by using the bending of the cantilever 31.

The bending of the cantilever 31 may be measured by using various methods. For example, as shown in FIG. 2, a degree of the bending of the cantilever 31 may be measured by using a light source 26 and a photodetector 27. The bending of the cantilever 35 is continually measured according to a feedback control while an interval between the sample 40 and the tip of the probe 37 of the cantilever 35 is constantly maintained by using the stage 50 on which the probe head 10 is mounted. The measured bending corresponds to information about the surface of the sample 40.

Light emitted from the light source 26 is radiated to upper surface of the cantilever 35, that is, opposite surface to surface to which the probe 37 is respectively attached. The photodetector 27 detects light that is emitted from the light source 26 and is reflected off the cantilever 35 and the bending of the cantilever 35 facing the sample 40 from among the cantilevers 31. The light source 26 and the photodetector 27 are spaced apart from the probe holder 30.

In order to easily arrange the light source 26 and the photodetector 27, a reflective mirror 29 may be further installed on the supporting portion 25. The reflective mirror 29 may be installed to be positioned on the rotation axis of the probe holder 30. For example, the light emitted from the light source 26 may be reflected off the reflective mirror 29 and may be radiated to the upper surface of the cantilever 35 facing the sample 40 from among the cantilever 35. In addition, light reflected off the cantilevers 31 may directly proceed toward the photodetector 27.

In this case, instead of the reflective mirror 29, a position sensitive photodetector (PSPD) may be installed as the photodetector 27.

It is important that relative positional relationship of the light source 26, the photodetector 27, and the probe holder 30 is not changed. To this end, the light source 26 and the photodetector 27 may be installed on the head structure 20 on which the supporting portion 25 is installed.

For example, as shown in FIGS. 1, 4, and 5, the head structure 20 has the overall shape of a claw. The supporting portion 25 may be formed protruding from the inner side surface 20a from among the internal side surfaces 20a and 20b facing each other. In this case, the light source 26 and the photodetector 27 may be installed on the internal side surface 20b. The shape of the head structure 20 and the arrangement of the light source 26 and the photodetector 27 may be changed in various ways.

In order to scan the surface of the sample 40, an internal between the sample 40 and the probe 37 of the cantilever 35 facing the sample 40 may be adjusted.

To this end, the stage 50 may include a z-axis stage 51 for adjusting the interval between the sample 40 and the probe 37 of the cantilever 35 facing the sample 40. The probe head 10 may be coupled to the z-axis stage 51 of the stage 50. Substantially, the head structure 20 may be coupled to the z-axis stage 51.

The stage 50 may include a xy stage 53 that moves the sample 40 or the probe head 10 in x-axis and y-axis directions so that the probes 33 of the cantilevers 31 may scan the surface of the sample 40 in a xy plan. For example, a sample holder 55 is positioned on the xy stage 53 and the sample 40 is positioned on the sample holder 55. In this case, as the xy stage 53 is moved with respect to the z-axis stage 51 to which the probe head 10 is coupled, the probe 37 attached to the ends of the cantilever 35 may scan the surface of the sample 40.

Alternately, the sample holder 55 is fixed onto a base (not shown) that is not moved by at least the stage 50, a stage 51 to which the probe head 10 is coupled is configured as a xyz state. In this case, as the probe head 10 is also moved in the x-axis and y-axis directions, the probe 37 attached to the end of the cantilever 35 may scan the surface of the sample 40.

In the probe head 10, a portion of the probe head 10, to which a probe is installed, that is, the probe holder 30 is of a rotary type, the cantilevers 31 having ends on which the probes 33 are attached are installed on a circumference of the probe holder. In addition, a cantilever having a blunt probe may be rapidly and easily exchanged with a new cantilever having a new probe by rotating the probe holder 30 in order to change the cantilevers 31.

In this case, since the rotation of the probe holder 30 may be finely controlled by a stepping motor or the like, a position of a new probe 33 may substantially match a position of the previous probe 33 by rotating the probe holder 30.

As described above, when the probe head 10 and the SPM 1 including the probe head 10 are used, large numbers of the cantilevers 31 may be mounted on the probe head 10. The probe holder 30 may be simply rotated in order to change the cantilevers 31, and thus the cantilevers 31 may be very rapidly changed. Since the distance between the probe head 10 and the stage 50, in particular, the xy stage 53 is barely changed, a scanning position prior to changing the probes 33 may be barely changed. Since a rotation angle of the probe holder 30 may be finely controlled by using a stepping motor or the like, even when the bending of the cantilevers 31 is detected by using a beam bounce method, light alignment may be easily obtained. In addition, since the scanning position is barely changed, various kinds of probes may be mounted on the probe holder 30 and various physical properties of a same point may be easily scanned as the probes are exchanged with each other according to a desired function. For example, a probe serving as a conductor may measure electrical properties and then a probe coated with a magnetic material may measure magnetic properties.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A probe holder comprising:
    a plurality of cantilevers and a plurality of probes corresponding to the plurality of cantilevers, each of the plurality of probes disposed on one of the plurality of cantilevers, respectively; and
    a holder on which the plurality of cantilevers are mounted and which is rotated by a stepping motor,
    wherein a rotation of the holder determines which of the plurality of cantilevers faces a sample, and
    wherein a reflective mirror installed on a rotation axis of the holder.

2. The probe holder of claim 1, wherein the plurality of cantilevers are detachably mounted on the holder.

3. The probe holder of claim 2, wherein the plurality of cantilevers are mounted on the holder such that there is a fixed distance between each of the cantilevers and a rotational axis of the holder, and the fixed distance is the same for each of the cantilevers.

4. The probe holder of claim 1, wherein the plurality of cantilevers are mounted on the holder such that there is a fixed distance between each of the cantilevers and a rotational axis of the holder, and the fixed distance is the same for each of the cantilevers.

5. The probe holder of claim 1, wherein the plurality of probes comprise at least one probe configured to measure a first physical property and at least a second probe configured to measure a second physical property, different from the first physical property.

6. A probe head comprising:
    a probe holder, a plurality of cantilevers mounted to the probe holder, and a plurality of probes corresponding to the plurality of cantilevers, each of the plurality of probes disposed on one of the plurality of cantilevers, respectively;
    a supporting portion, wherein the probe holder is rotatably coupled to the supporting portion, the holder is rotatable, and a rotation of the holder determines which of the plurality of cantilevers faces a sample;
    a light source which emits light;
    a photodetector which detects light that is emitted from the light source and is reflected off the cantilever, such that a bending of a cantilever positioned to face a sample can be determined based on the light detected by the photodetector, wherein the light source and the photodetector are spaced apart from the holder; and
    a reflective mirror disposed on the supporting portion, wherein light emitted from the light source is reflected by the reflective mirror and thereby directed to the cantilever.

7. The probe head of claim 6, wherein the plurality of cantilevers are detachably mounted on the holder.

8. The probe head of claim 7, wherein the plurality of cantilevers are mounted on the holder such that there is a fixed distance between each of the cantilevers and a rotational axis of the holder, and the fixed distance is the same for each of the cantilevers.

9. The probe head of claim 6, wherein the plurality of cantilevers are mounted on the holder such that there is a fixed distance between each of the cantilevers and a rotational axis of the holder, and the fixed distance is the same for each of the cantilevers.

10. The probe head of claim 6, wherein the holder is detachably coupled to the supporting portion.

11. The probe head of claim 6, wherein the plurality of probes comprise at least one probe configured to measure a first physical property and at least a second probe configured to measure a second physical property, different form the first physical property.

12. The probe head of claim 6, wherein the probe head is configured to be coupled to a stage of a scanning probe microscope, and
    wherein the stage is adjustable to adjust an interval between the sample and the plurality of probes.

13. A scanning probe microscope (SPM) comprising:
    a probe head; and
    a stage to which the probe head is coupled,
    wherein the probe head comprises a probe holder a plurality of cantilevers mounted to the probe holder, and a plurality of probes corresponding to the plurality of cantilevers, each of the plurality of probes disposed on one of the plurality of cantilevers, respectively; and a supporting portion, wherein the holder is rotatably coupled to the supporting portion,
    wherein the holder is rotatable, an a rotation of the holder determines which of the plurality of cantilevers faces a sample;
    a light source which emits light;
    a photodetector which detects light that is emitted from the light source and is reflected off the cantilever, such that a bending of a cantilever positioned to face a sample can be determined based on the light detected by the photodetector, wherein the light source and the photodetector are spaced apart from the holder; and
    a reflective mirror disposed on the supporting portion, wherein light emitted from the light source is reflected by the reflective mirror and thereby directed to the cantilever.

14. The SPM of claim 13, wherein the plurality of cantilevers are detachably mounted on the holder.

15. The SPM of claim 14, wherein the plurality of cantilevers are mounted on the holder such that there is a fixed distance between each of the cantilevers and a rotational axis of the holder, and the fixed distance is the same for each of the cantilevers.

16. The SPM of claim 13, wherein the plurality of cantilevers are mounted on the holder such that there is a fixed distance between each of the cantilevers and a rotational axis of the holder, and the fixed distance is the same for each of the cantilevers.

17. The SPM of claim 13, wherein the holder is detachably coupled to the supporting portion.

18. The SPM of claim 13, wherein the plurality of probes comprise at least one probe configured to measure a first physical property and at least a second probe configured to measure a second physical property, different form the first physical property.

19. The SPM of claim 13, wherein the stage is adjustable to adjust an interval between the sample and the plurality of probes.

20. The SPM of claim 13, wherein the holder is detachable from the supporting portion after each of the plurality of cantilevers is used as a cantilever facing the sample.

21. The SPM of claim 13, wherein the light source and the photodetector are disposed on the probe head.

22. A probe head comprising:
a rotatable probe holder;
a plurality of cantilevers, each cantilever disposed on the probe holder such that there is a fixed distance between each of the cantilevers and a rotational axis of the probe holder;
a plurality of probes, each probe disposed on one of the plurality of cantilevers;
wherein a rotation of the probe holder determines which of the plurality of probes is in a position closest to a sample;
a light source which emits light; and
a photodetector which detects light that is emitted from the light source and is reflected off the cantilever, such that a bending of a cantilever positioned to face a sample can be determined based on the light detected by the photodetector, wherein the light source and the photodetector are spaced apart from the holder; and
a reflective mirror disposed on a supporting portion, wherein light emitted from the light source is reflected by the reflective mirror and thereby directed to the cantilever.

* * * * *